Robert Humphery, West Troy, N.Y.

101623 Horse Collar. PATENTED APR 5 1870

Witnesses: Alex. Selkirk, Cha. Selkirk,

Robert Humphrey, Inventor.

United States Patent Office.

ROBERT HUMPHREY, OF WEST TROY, NEW YORK.

Letters Patent No. 101,623, dated April 5, 1870.

IMPROVEMENT IN HORSE-COLLARS.

The Schedule referred to in these Letters Patent and making part of the same.

*To all whom it may concern:*

Be it known that I, ROBERT HUMPHREY, of West Troy, Albany county, State of New York, have invented certain new and useful Improvements in Draft-Collars for Horses, Mules, and other Animals; and I do hereby declare that the following is a description thereof, reference being had to the accompanying drawings forming a part of this specification, in which—

Figure 1:
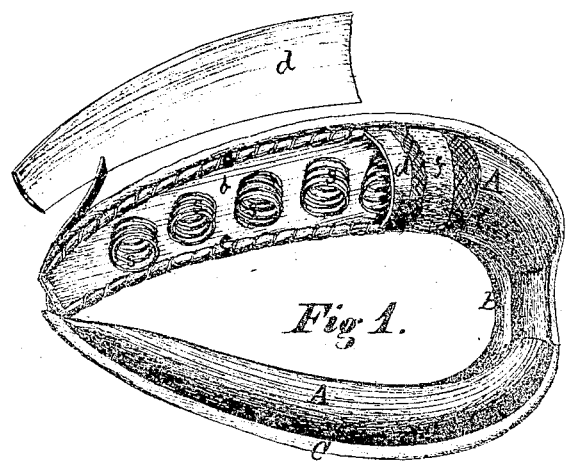
Figure 1 represents a perspective view of a draft-collar with parts cut away, exposing the improvements as they are applied in this invention.

The galling of horses and other draft-animals is caused by the uneven pressure of the collar and constant friction attending the use of the same when the animal is at work, and more especially when the labor performed by the animal is constant and under a continual strain, as in the case of drawing canal-boats, teaming, trucking, and the like.

The nature of my invention consists in the employment of elastic springs of coiled wire, so placed in the body of the collar, and under the facing-piece, that the said springs will yield when a pressure shall be brought to bear on the collar by reason of the draft of the animal when at work.

To enable others skilled in the art to make and use my invention, I will proceed to describe it in reference to the drawings and letters of reference marked thereon, the same letters indicating similar parts.

In the drawings—

A represents the body of a collar.

B is the usual rim.

C is the usual shoulder-piece.

D is the usual facing-leather.

In constructing a collar with the improvements in this invention, I build up the body A only to a part, *a*, of what is usually made. The said part *a* I denominate the back.

Figure 2:
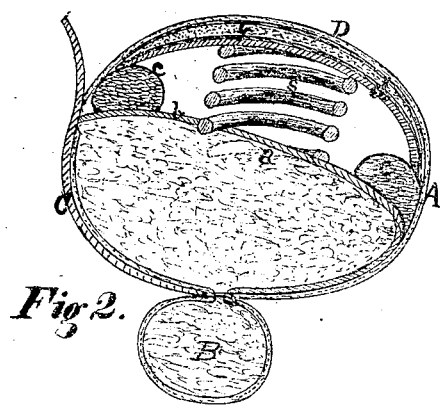
Figure 2 represents a cross-section through one side of a collar, and illustrating the invention on an enlarged scale.

The said back *a* is formed by stuffing up hard and solid as possible, with straw or other material now used, the case *b*, fig. 2.

Figure 3:
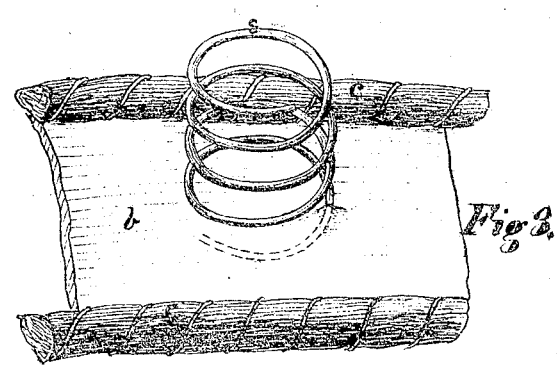
Figure 3 represents an enlarged view in perspective of the improvements.
Figure 4:
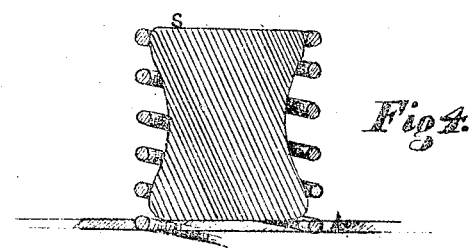
Figure 4 is another illustration of a modification of the spring.

Upon the said back *a*, I plant several elastic springs, *s*, formed of coiled spring-wire, or of a combination of both coiled wire and rubber, as in fig. 4; and, according to the size of the collar and the work it is to be put to, I place such springs *s*, in number from six to eight, more or less, and secure them firmly in their places on the upper casing *b* of the back *a*, as shown in figs. 1, 2, and 3.

The said springs, when made of coiled wire, may have their upper or both ends capped with tin or other sheet metal, if desired.

I also build, of straw or of other suitable material, on each edge of the upper casing *b*, a flange or rim, *c c*, figs. 1, 2, and 3.

The said flanges *c c* are firmly bound down on the said casing-piece *b* by strong twine, as shown in fig. 3, which twine keeps them in their places.

The flanges *c c* support the edges of the spring-guard *d*, so as to form a chamber under the shoulder-piece D for the reception of the spring, and preserve the form of the collar, as shown.

I then place over the springs *s s s*, figs. 1 and 2, a piece, *d*, which I denominate the spring-guard.

The said spring-guard *d* consists of a piece of trunk or tar-board, or of hard leather, formed longitudinally, to correspond with the length of each lobe of the collar, while its width at its several points is such as will correspond with the width of the collar at its several corresponding points.

I also give to the said spring-guard *d* a curved form, as shown in fig. 2.

I also draw over the upper side of the said guard two or more thicknesses of cloth, *e e*, figs. 1 and 2, and also add to the same some hair stuffing, *f*.

I then place the said spring-guard *d* in position over the springs *s s*, and in such a manner that the edges of the said guard will rest on the flanges *c c*, as in figs. 1 and 2.

I then draw over and secure, in the usual manner, by stitching, the usual facing-leather, D.

The elasticity of a collar constructed as described above is such that under draft the several portions of the collar in contact with the animal will be brought to bear evenly upon the usual wearing portions of the breast and shoulders of the animal, which will enable the animal to work with greater ease and comfort; and, when a sudden shock or halt is given to the animal by some obstacle brought suddenly in contact, the yielding of the collar to the animal will lessen such shock, and lighten the blow which the animal would otherwise receive.

Having described my invention,

What I claim, and desire to secure by Letters Patent, is—

1. In draft-collars for horses or other animals, the elastic springs *s s*, when arranged to operate in the manner substantially as specified, for the purpose set forth.

2. The straw flanges *c c*, constructed on the upper casing *b*, substantially as and for the purpose set forth.

3. The spring-guard *d*, in combination with the springs *s s*, substantially as and for the purpose set forth.

4. Elastic springs *s s*, in combination with the flanges *c c* and guard *d*, substantially as and for the purpose set forth.

ROBERT HUMPHREY.

Witnesses:
 ALEX. SELKIRK,
 CHAS. SELKIRK.